(12) United States Patent
Miller et al.

(10) Patent No.: US 10,288,520 B1
(45) Date of Patent: May 14, 2019

(54) APPARATUS AND PROCESS FOR TESTING AN AERO VEHICLE AT HIGH MACH NUMBER

(71) Applicant: Florida Turbine Technologies, Inc., Jupiter, FL (US)

(72) Inventors: Timothy J Miller, Jupiter, FL (US); John E Ryznic, Jupiter, FL (US)

(73) Assignee: FLORIDA TURBINE TECHNOLOGIES, INC, Jupiter, FL (US)

( * ) Notice: Subject to any disclaimer, the term of this patent is extended or adjusted under 35 U.S.C. 154(b) by 163 days.

(21) Appl. No.: 15/602,306

(22) Filed: May 23, 2017

Related U.S. Application Data

(60) Provisional application No. 62/463,121, filed on Feb. 24, 2017.

(51) Int. Cl.
*G01M 15/14* (2006.01)
*G01M 9/04* (2006.01)
*F02C 3/14* (2006.01)

(52) U.S. Cl.
CPC .............. *G01M 9/04* (2013.01); *G01M 15/14* (2013.01); *F02C 3/14* (2013.01); *F05D 2260/83* (2013.01)

(58) Field of Classification Search
CPC ................... F02C 6/16; F05D 2260/83; F23R 2900/00019; G01M 15/14; G01M 17/007; G01M 9/02
See application file for complete search history.

(56) References Cited

U.S. PATENT DOCUMENTS

| | | | | |
|---|---|---|---|---|
| 5,537,822 A | * | 7/1996 | Shnaid | F02C 6/04 60/650 |
| 5,934,063 A | * | 8/1999 | Nakhamkin | F02C 6/06 60/727 |
| 7,401,505 B1 | * | 7/2008 | Schultz | G01M 9/04 73/147 |
| 7,500,349 B2 | * | 3/2009 | Althaus | F01D 25/305 60/39.511 |
| 7,614,237 B2 | * | 11/2009 | Nakhamkin | F01D 15/10 60/39.183 |
| 7,810,384 B2 | * | 10/2010 | Ono | F01D 25/285 73/112.01 |
| 8,011,189 B2 | * | 9/2011 | Nakhamkin | F02C 6/16 60/39.183 |
| 8,261,552 B2 | * | 9/2012 | Nakhamkin | F01K 3/12 60/659 |
| 8,341,964 B2 | * | 1/2013 | Finkenrath | F02C 6/16 60/727 |
| 8,689,566 B1 | * | 4/2014 | Coney | F01K 23/103 60/39.5 |

(Continued)

*Primary Examiner* — Freddie KIrkland, III
(74) *Attorney, Agent, or Firm* — John Ryznic

(57) ABSTRACT

An apparatus and a process for testing a large combustor or a high Mach aero vehicle in a wind tunnel, where liquid air stored in a tank is pumped to a high pressure above 1,500 psi, then vaporized to produce gaseous air at the same high pressure, where the high pressure gaseous air is then heated to a high temperature and then passed into a combustor for testing or passed through a converging diverging nozzle and then into a wind tunnel to produce a non-vitiated gaseous air flow of at least Mach 5 for testing of an aero vehicle. Water can be added to the high pressure liquid air to produce an air flow having a normal water content.

11 Claims, 2 Drawing Sheets

(56) References Cited

U.S. PATENT DOCUMENTS

| | | | | |
|---|---|---|---|---|
| 8,726,629 B2* | 5/2014 | Coney | F01K 23/103 60/39.5 |
| 8,739,522 B2* | 6/2014 | Anikhindi | F02C 1/04 60/327 |
| 8,984,893 B2* | 3/2015 | Schroder | F02C 6/16 60/772 |
| 9,200,983 B2* | 12/2015 | Brostmeyer | G01M 15/14 |
| 9,383,105 B2* | 7/2016 | Naeve | F02C 6/16 |
| 9,410,869 B2* | 8/2016 | Brostmeyer | G01M 15/14 |
| 9,604,756 B1* | 3/2017 | Brostmeyer | G01M 15/14 |
| 9,654,161 B2* | 5/2017 | Brostmeyer | G01M 15/14 |
| 2004/0148922 A1* | 8/2004 | Pinkerton | F02C 1/05 60/39.6 |
| 2009/0100835 A1* | 4/2009 | Nakhamkin | F01D 15/10 60/659 |
| 2010/0043437 A1* | 2/2010 | Nakhamkin | F01D 15/10 60/645 |
| 2010/0083660 A1* | 4/2010 | Nakhamkin | F02C 6/16 60/652 |
| 2010/0251712 A1* | 10/2010 | Nakhamkin | F01K 3/12 60/659 |
| 2011/0094236 A1* | 4/2011 | Finkenrath | F02C 6/16 60/772 |
| 2014/0026650 A1* | 1/2014 | Hobelsberger | G01M 15/14 73/112.02 |
| 2014/0053641 A1* | 2/2014 | Brostmeyer | G01M 15/14 73/112.01 |
| 2016/0069777 A1* | 3/2016 | Brostmeyer | G01M 15/14 73/112.05 |

* cited by examiner

APPARATUS AND PROCESS FOR TESTING AN AERO VEHICLE AT HIGH MACH NUMBER

CROSS-REFERENCE TO RELATED APPLICATIONS

This application claims the benefit to U.S. Provisional Application 62/463,121 filed on Feb. 24, 2017 and entitled APPARATUS AND PROCESS FOR TESTING AN AERO VEHICLE AT HIGH MACH NUMBER.

GOVERNMENT LICENSE RIGHTS

None.

BACKGROUND OF THE INVENTION

Field of the Invention

The present invention relates generally to an apparatus and a process for supplying a large volume of compressed air for testing a component of a gas turbine engine or an aero vehicle, and more specifically for testing a high Mach number aero vehicle.

Description of the Related Art Including Information Disclosed Under 37 CFR 1.97 and 1.98

In a previous idea by one of the applicants of the present invention, a large volume of high pressure compressed air can be supplied to a testing facility from a large underground storage reservoir such as a converted salt dome. U.S. Pat. No. 9,200,983 issued to Brostmeyer on Dec. 1, 2015 entitled APPARATUS AND PROCESS FOR TESTING AN INDUSTRIAL GAS TURBINE ENGINE AND COMPONENTS THEREOF discloses such invention. one major limitation of the Brostmeyer idea is that the test facility must be located adjacent to an underground storage reservoir such as that found at a CAES facility in Macintosh, Ala. or Hundorf Germany, or a salt dome must be prepared and converted into a storage reservoir.

BRIEF SUMMARY OF THE INVENTION

A testing facility that requires a large volume of high pressure air for testing an aero vehicle at high Mach number speed or a large combustor of an industrial gas turbine engine, where the source of compressed air is a tank of liquid air that is heated to produce gaseous air at a high pressure, and then further heated in stages to the high temperature required for simulating a high Mach number speed in a wind tunnel.

Liquid air contains little or no water, thus water of around 15% is added to reproduce normal gaseous air from the environment. The water is added after the liquid air has been vaporized into gaseous air in order to prevent the water from freezing. Water can be added by burning oxygen with hydrogen either in liquid form or gaseous form that would also add heat to the liquid or gaseous air and aid in the conversion from liquid to gaseous air.

To produce high Mach # flow, a throat is used to expand the high pressure gaseous air discharged into a wind tunnel where the flow increases in speed to that required to test an aero vehicle under speeds up to Mach 10.

DETAILED DESCRIPTION OF THE INVENTION

The present invention is an improvement of the Brostmeyer U.S. Pat. No. 9,200,983 (incorporated herein by reference) where the underground storage reservoir is replaced with an above ground tank that stores liquid air that is then heated and converted to gaseous air for use in testing a gas turbine engine component such as a combustor or an aero vehicle in a wind tunnel such as under high Mach # speed such as Mach 5 to Mach 10. With the use of the above ground liquid air tank, the test facility can be located anywhere and does not rely on a geographic feature such as an underground storage reservoir.

The liquid air storage tank can be one large tank or formed from several small tanks that can each be transported to a test facility with the liquid air already stored inside. Trucks or railroad tank cars can be used to carry liquid air to the test site from a plant that produces the liquid air.

Figure 1:
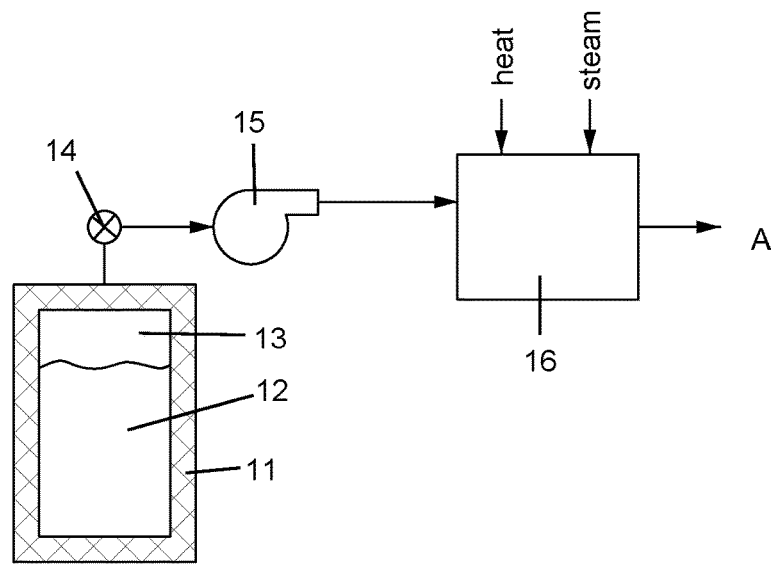
FIG. 1 shows a diagram of a testing facility using a liquid air storage tank to supply high pressure compressed air to a test section according to the present invention.

FIG. 1 shows a diagram view of a test facility using a liquid air storage tank 11 which stores liquid air 12 at around 30 psia and around minus 195 degrees C. The liquid air storage tank 11 is insulated to limit heat transfer from the relatively hot outside and into the cold liquid air 12 with a gas pocket (ullage) 13 above the liquid air 12. The liquid air 12 is pumped from the tank 11 to a vaporizer 16. The liquid air is pumped instead of gaseous air because it is easier and more efficient to pump a liquid than a gas. Liquid air is pumped from around 1,500-3,000 psi at around minus 195 degrees C. into one or more devices such as pump 15 that will heat up the liquid air and convert it to gaseous air. Since liquid air contains no water, a high temperature steam can be used to not only heat up the liquid air but to add around 15% water to the gaseous air exiting the vaporizer 16. The gaseous air exiting the vaporizer 16 would be very cold gaseous air slightly above the minus 195 degrees C. (such as minus 170 degrees C.) and at around 1,500-3,000 psi. The addition of heat to convert the liquid air to gaseous air could be from electrical heating, chemical heating, or hot steam. The hot steam could even be burning hydrogen with oxygen to produce a very high temperature steam flow to convert the high pressure liquid air to high pressure gaseous air via a purpose built heat exchanger or injected directly to the high pressure liquid air stream to add moisture to the dry compressed air. Any water, either through injection of steam or burning of hydrogen and oxygen, is introduced into the liquid air after it is converted into gaseous air in order to prevent ice from forming. If the introduction of steam or burning of hydrogen and oxygen could be discharged into the liquid air without forming ice crystals, then this can be done and would aid in the conversion of the liquid air into gaseous air.

The high pressure and cold gaseous air with or without water is then passed through heating devices to increase the temperature suitable for the type of testing required of the compressed air flow. The cold gaseous air can flow first through a pre-heater 17, then through a first heat exchanger 18 and then a second heat exchanger 19 to bring the gaseous air with or without water up to a desired temperature. This air flow is non-vitiated air that has a normal oxygen content identical to that found in atmospheric air that has not been combusted with a fuel. In one embodiment, a preheater 17 can be used to preheat the compressed air followed by one or more heat exchangers (18, 19) that can increase the compressed air temperature to 2,000 degrees F. or even 3,000 degrees F. For testing of a combustor such as a large frame heavy duty industrial gas turbine engine combustor, the temperature of the compressed air entering the combustor should be equal to the temperature that would be produced by a compressor for that engine. The compressed air would thus be heated to a temperature to simulate the outlet of a compressor that would feed the combustor being tested. For testing an aero vehicle at Mach # speed, the temperature of the air would be heated to simulate the real conditions that would exist if the vehicle was actually traveling through the atmosphere at that speed. As the Mach # for testing increases, the gaseous air flow would need to be heated further in temperature.

Figure 2:
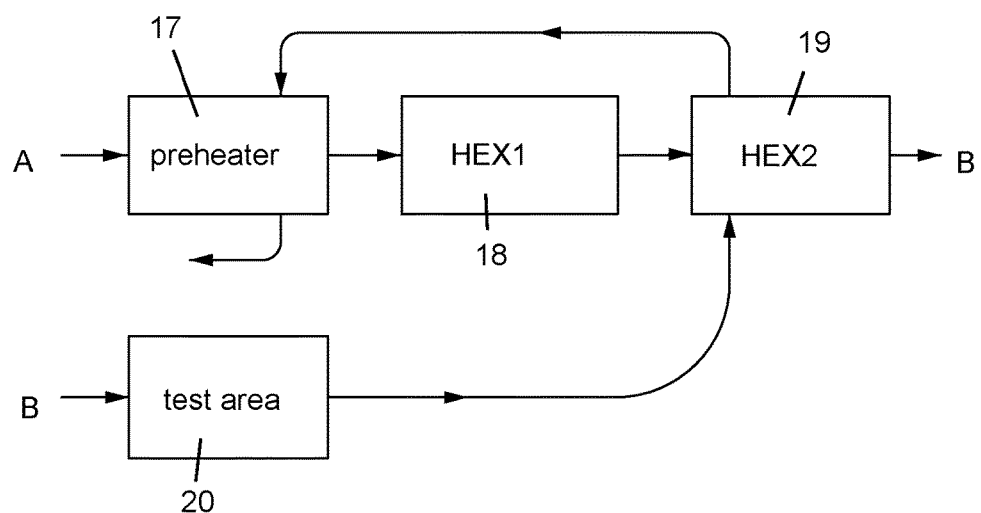
FIG. 2 shows a diagram of a test section for testing a high Mach # aero vehicle using the compressed air from the liquid air tank of FIG. 1.
Figure 3:
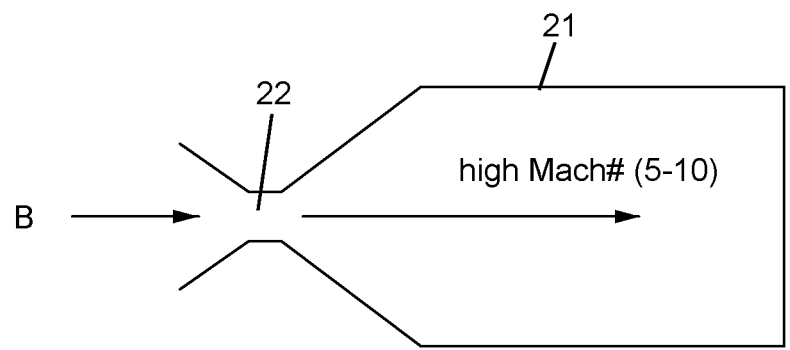
FIG. 3 shows a cross section view of a wind tunnel with an entrance throat for testing a vehicle at high Mach # speeds according to the present invention.

FIG. 2 shows a section of a test facility that would be used to test an aero vehicle at high a Mach number such as Mach 5 to Mach10 such as in a wind tunnel 21 (FIG. 3). Lower Mach #s could also be tested using the ideas of the present invention. The compressed air from the FIG. 1 facility would be heated to a specific temperature such that when the compressed air exiting at A flows through a throat 22 as shown in FIG. 3 and expands in the diverging section where an aero vehicle is secured for testing, the temperature drop after the throat would be at the required temperature to simulate the high Mach flow at specific altitudes. For example, the temperature drop downstream from the throat could be as high as 1,000 degrees F. or greater, and thus the temperature of the compressed air would need to be 3,000 degrees F. or higher if the required test temperature is 2,000 degrees F. for a low Mach # test, such as just above Mach 1, the temperature of the gaseous air passed through the wind tunnel would be lower than 1,000 degrees F. and would be at the temperature to simulate conditions that would be produced at that speed if the aero vehicle was actually flying through the atmosphere at that speed.

We claim the following:

1. A process for testing a combustor or an aero vehicle comprising the steps of:
   storing liquid air in a storage tank;
   pumping the liquid air from the storage tank to produce a high pressure liquid air above 1,000 psi;
   vaporizing the high pressure liquid air to produce a high pressure gaseous air;
   adding heat to the high pressure gaseous air to produce a gaseous air flow with a temperature simulating a real condition; and,
   passing the gaseous air flow at a temperature simulating the condition into a combustor or a wind tunnel for testing.

2. The process for testing a combustor or an aero vehicle of claim 1, and further comprising the step of:
   adding water to the high pressure liquid air to produce a non-vitiated gaseous air.

3. The process for testing a combustor or an aero vehicle of claim 1, and further comprising the step of:
   burning hydrogen with oxygen in the high pressure liquid air to produce a non-vitiated gaseous air.

4. The process for testing a combustor or an aero vehicle of claim 1, and further comprising the step of:
   the step of pumping the liquid air to produce a high pressure liquid air includes pumping the liquid air to 1,500 psi or above.

5. The process for testing a combustor or an aero vehicle of claim 1, and further comprising the step of:
   pumping the liquid air to produce a high pressure liquid air includes pumping the liquid air to at least 3,000 psi.

6. The process for testing a combustor or an aero vehicle of claim 1, and further comprising the steps of:
   passing the high pressure gaseous air flow through a throat to; and,
   expanding the gaseous air flow in a wind tunnel to produce a gaseous air flow of at a temperature to simulate a real condition.

7. A testing facility for testing a high Mach vehicle in a wind tunnel comprising:
   a liquid air storage tank;
   a pump to pump liquid air from the storage tank to a pressure above 1,500 psi;
   a vaporizer to convert the liquid air from the pump into a gaseous air stream above 1,500 psi;
   a heat exchanger to add heat to the gaseous air at a pressure above 1,500 psi;
   a throat located downstream from the heat exchanger; and,
   a wind tunnel located downstream from the throat; wherein the gaseous air above 1,500 psi expands after the throat to produce a gaseous air flow in the wind tunnel of at least Mach 1.

8. The testing facility of claim 7, and further comprising:
   the vaporizer includes a device to add water to the high pressure liquid air.

9. The testing facility of claim 8, and further comprising:
   the device to add water includes adding high temperature steam.

10. The testing facility of claim 8, and further comprising:
    the device to add water includes burning hydrogen with oxygen to add heat and water to the liquid air.

11. The testing facility of claim 7, and further comprising:
    the heat exchanger includes a series of heat exchangers.

* * * * *